(12) United States Patent
Fails et al.

(10) Patent No.: US 7,546,852 B1
(45) Date of Patent: Jun. 16, 2009

(54) FLEXIBLE INSERT FOR TUBING

(76) Inventors: Sidney T. Fails, 5934 N. Willamsburg Rd., Bassfield, MS (US) 39421; Vickie L. Fails, 5934 N. Williamsburg Rd., Bassfield, MS (US) 39421

( * ) Notice: Subject to any disclaimer, the term of this patent is extended or adjusted under 35 U.S.C. 154(b) by 0 days.

(21) Appl. No.: 12/230,318

(22) Filed: Aug. 27, 2008

(51) Int. Cl.
*F16L 11/00* (2006.01)

(52) U.S. Cl. ................ 138/109; 138/139; 138/118; 285/114

(58) Field of Classification Search ........... 138/109, 138/103, 172, 178, DIG. 8; 285/114–116, 285/354, 379
See application file for complete search history.

(56) References Cited

U.S. PATENT DOCUMENTS

| 790,971 | A | * | 5/1905 | Nicholls | 285/115 |
| 2,109,522 | A | * | 3/1938 | Boyle | 285/379 |
| 2,608,421 | A | * | 8/1952 | Schnepp | 285/222.5 |
| 3,610,289 | A | * | 10/1971 | Moss | 138/90 |
| 3,881,754 | A | * | 5/1975 | Christie | 285/114 |
| 4,032,177 | A | | 6/1977 | Anderson | 285/24 |
| 4,176,421 | A | | 12/1979 | Baird | 15/320 |
| 4,411,290 | A | | 10/1983 | Heath | 137/615 |
| 4,413,643 | A | | 11/1983 | Wiklund | 137/68.23 |
| 4,459,168 | A | | 7/1984 | Anselm | 156/143 |
| 4,487,444 | A | * | 12/1984 | Hensen | 285/114 |
| 4,489,937 | A | | 12/1984 | Kong | 482/126 |
| 4,628,966 | A | | 12/1986 | Kanao | 138/122 |
| 5,036,890 | A | * | 8/1991 | Whaley | 138/109 |
| 5,975,144 | A | | 11/1999 | Akedo et al. | 138/129 |
| 6,123,111 | A | * | 9/2000 | Nathan et al. | 138/109 |
| 6,161,591 | A | | 12/2000 | Winter et al. | 138/121 |
| 6,283,137 | B1 | | 9/2001 | Malecki | 137/1 |
| 6,769,452 | B2 | | 8/2004 | Qutub et al. | 138/114 |

FOREIGN PATENT DOCUMENTS

| GB | 2076491 A | 12/1981 |
| JP | 10078190 | 3/1998 |

\* cited by examiner

*Primary Examiner*—Patrick F Brinson
(74) *Attorney, Agent, or Firm*—Richard C. Litman

(57) ABSTRACT

The flexible insert for tubing includes an insert for water service tubing or the like that prevents the formation of stress cracks on the tubing when using a compression fitting. The insert is formed, at least in part, from an elongated, resilient, helical coil having opposed first and second ends. In one embodiment, the coil terminates in an enlarged turn or loop at one end of the coil that serves to retain the coil in the tubing. In another embodiment, the coil is butt welded to one end of a short, rigid sleeve having an annular flange at the opposite end. The insert also includes an O-ring and a compression nut.

4 Claims, 4 Drawing Sheets

US 7,546,852 B1

FLEXIBLE INSERT FOR TUBING

BACKGROUND OF THE INVENTION

1. Field of the Invention

The present invention relates to fittings for flexible tubing used in plumbing connections for water and gas, and particularly to a flexible insert for tubing having a stiffener made, at least in part, from a resilient, helical coil.

2. Description of the Related Art

Flexible tubing, such as polyethylene tubing, is used for a wide variety of applications, such as water delivery and in the delivery of natural gas. Hoses and tubes are often joined to a valve or other fixture of a water supply by a compression fitting. A great deal of stress is placed on the tubing near the point of connection, particularly from the weight of soil backfill for at least partially buried tubing. If the tubing bends at too sharp a radius, the tubing may develop cracks that deteriorate over time, causing expensive leaks. Rigid stiffeners are often used in combination with flexible tubing, particularly in combination with compression fittings, however, such rigid stiffeners exacerbate this problem. Thus, a flexible insert for tubing solving the aforementioned problems is desired.

SUMMARY OF THE INVENTION

The flexible insert for tubing includes an insert for water service tubing or the like that prevents the formation of stress cracks on the tubing when using a compression fitting. The insert is formed, at least in part, from an elongated, resilient, helical coil having opposed first and second ends. In one embodiment, the coil terminates in an enlarged turn or loop at one end of the coil that serves to retain the coil in the tubing. In another embodiment, the coil is butt welded to one end of a short, rigid sleeve having an annular flange at the opposite end. The compression fitting also includes an O-ring and a compression nut.

In use, the compression nut and O-ring are placed over the tubing, the insert is placed into the open end of the flexible tubing or conduit with the enlarged coil turn or sleeve annular flange abutting the open end, and the compression nut is threaded onto the valve or other threaded fitting, compressing the O-ring to form a seal. The insert provides sufficient stiffness for structural reinforcement of the tubing to prevent collapse of the tubing, but sufficient flexibility to permit the tubing to bend as needed, but not in a sharp radius.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The flexible insert 10 for flexible tubing has an insert for gas or water service tubing T that prevents the formation of stress cracks on the tubing T at the main line connection point. Rigid inserts typically used with compression fittings typically crack the tubing T near the main line connection point due to the stress caused by the weight of settling earth backfill on the tubing and the insert. The flexible insert 10 provides additional structural integrity and distribution of stress forces along the length of the tubing T.

Figure 1:
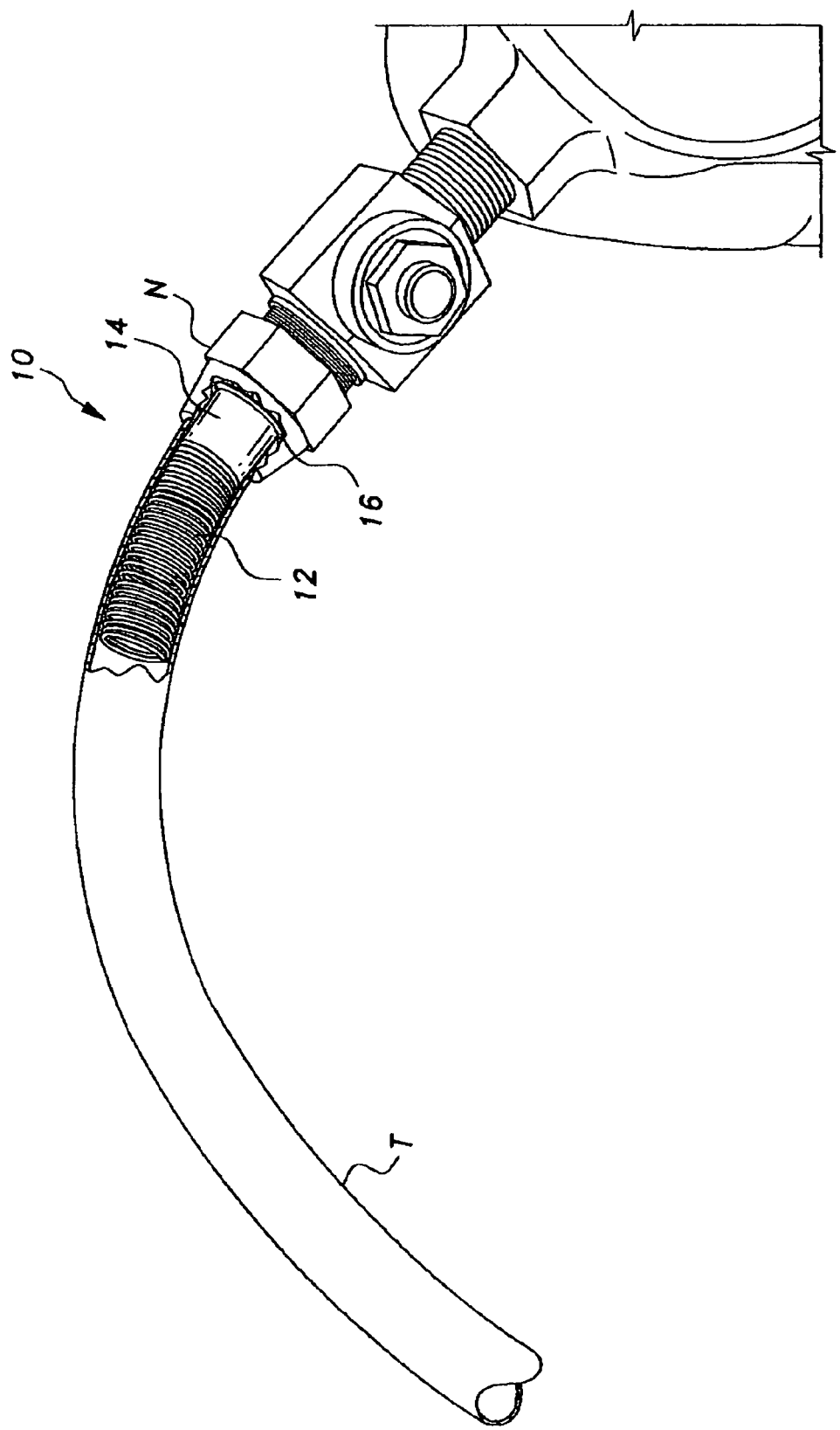
FIG. 1 is an environmental, perspective view of a first embodiment of a flexible insert for tubing according to the present invention.
Figure 3:
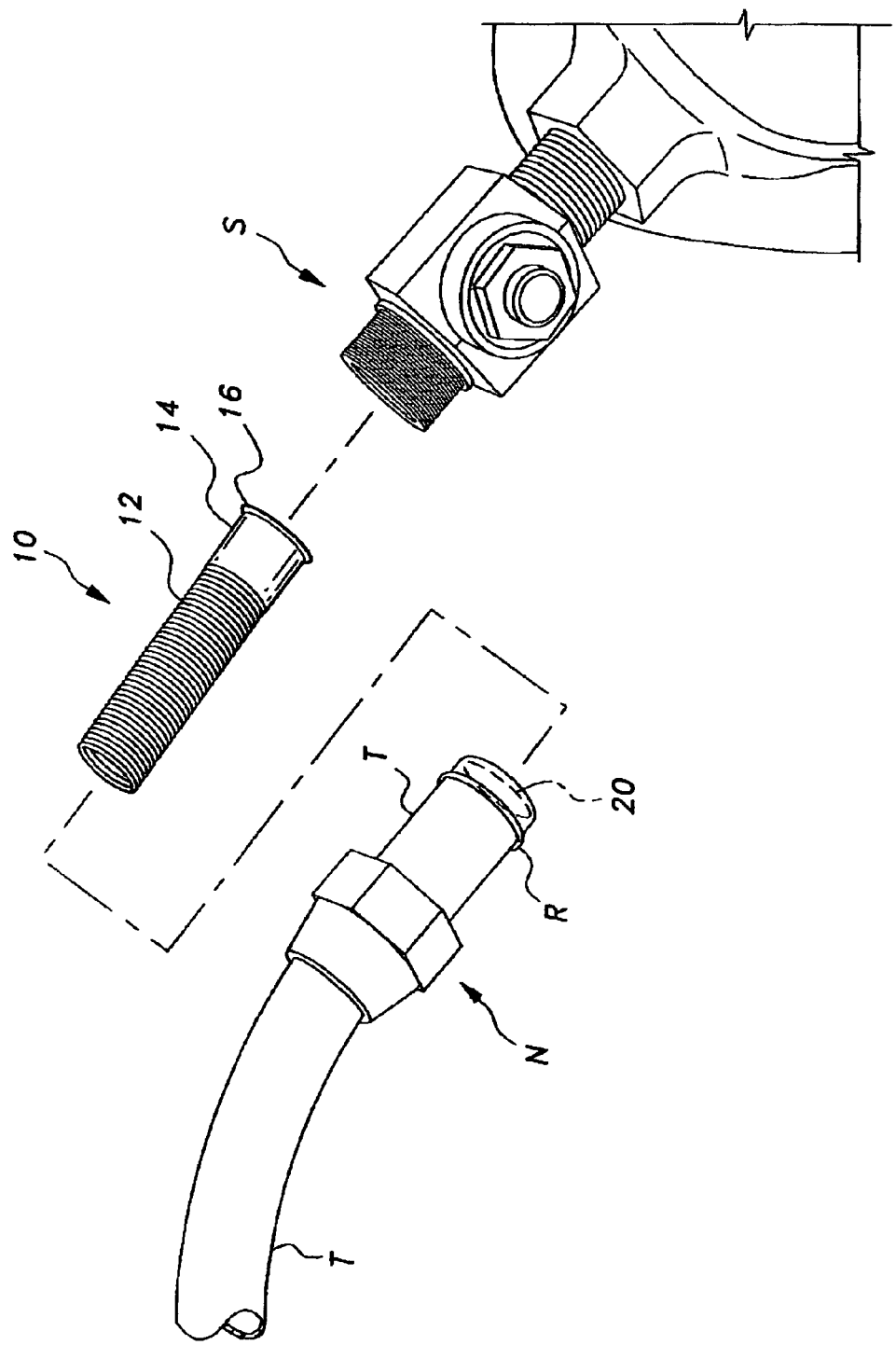
FIG. 3 is an exploded environmental, perspective view of the flexible insert of FIG. 1.

In the drawings, the flexible insert 10 is shown being used with water service tubing T applied to a valve S or other threaded fitting and held by a compression nut N. FIGS. 1 and 3 show an exemplary connection for tubing T using a flexible insert 10. The compression fitting includes a compression nut N, an O-ring R, and an insert. As shown, the compression nut N is slid is onto the tubing T, followed by the O-ring R. The insert tube is then slid into the tubing T and the compression nut N is tightened. As the compression nut N is tightened, the O-ring R compresses, forming a seal around the tubing T.

Figure 2:
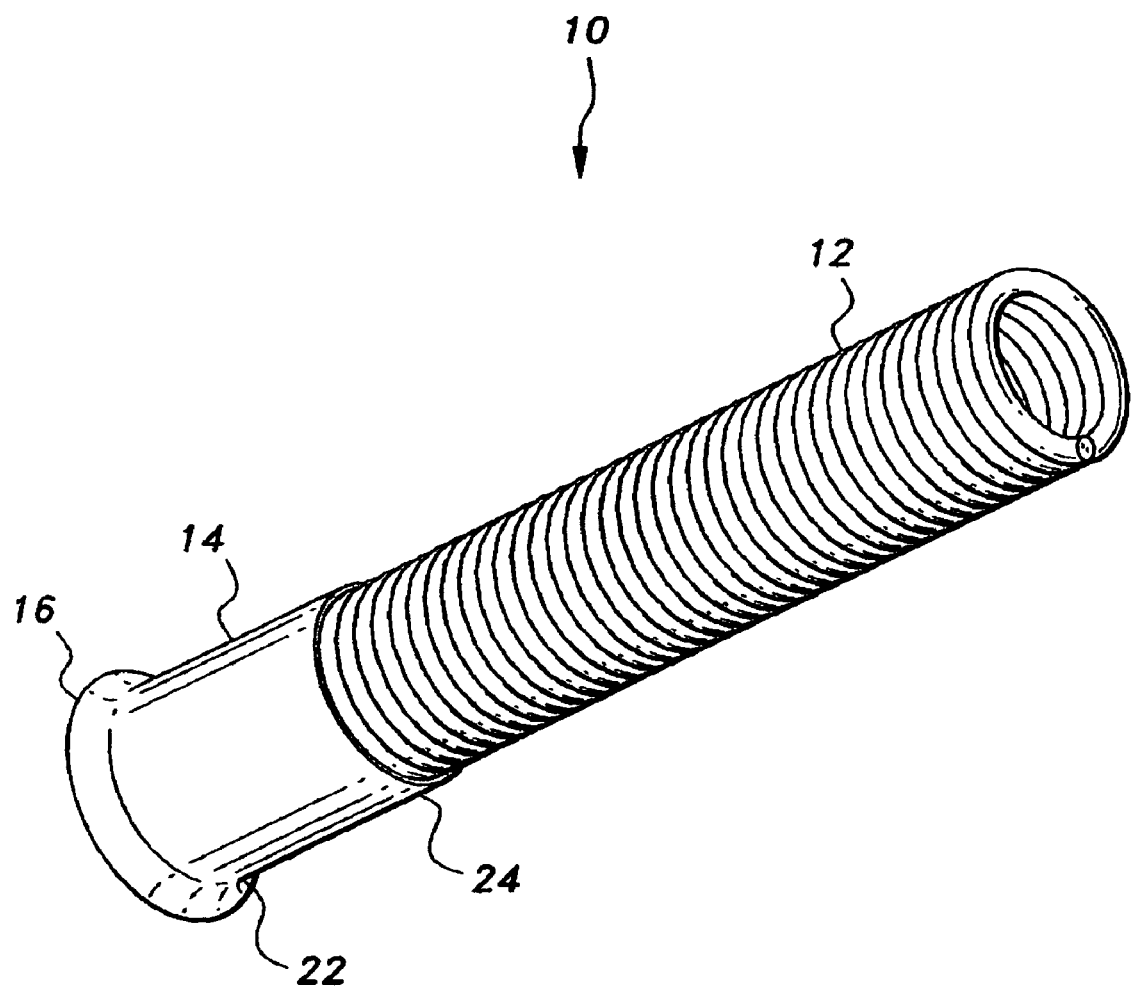
FIG. 2 is a perspective view of a first embodiment of a flexible insert for tubing according to the present invention.

The insert includes a relatively tightly wound, elongated, resilient helical coil 12 formed from stainless steel or any other suitable resilient, flexible material that is non-corrosive and resistant to water damage. The helical coil 12 preferably has an outer diameter corresponding to the inner diameter of the tubing T. In one embodiment, shown in FIGS. 1-3, the insert has a hollow, rigid, cylindrical sleeve 14 having an annular flange at one end 22. The opposite end 24 is butt welded to the end of the coil 12, as best shown in FIG. 2. Sleeve 14 is formed from stainless steel or any other suitable material that is non-corrosive and resistant to water damage.

Figure 4:
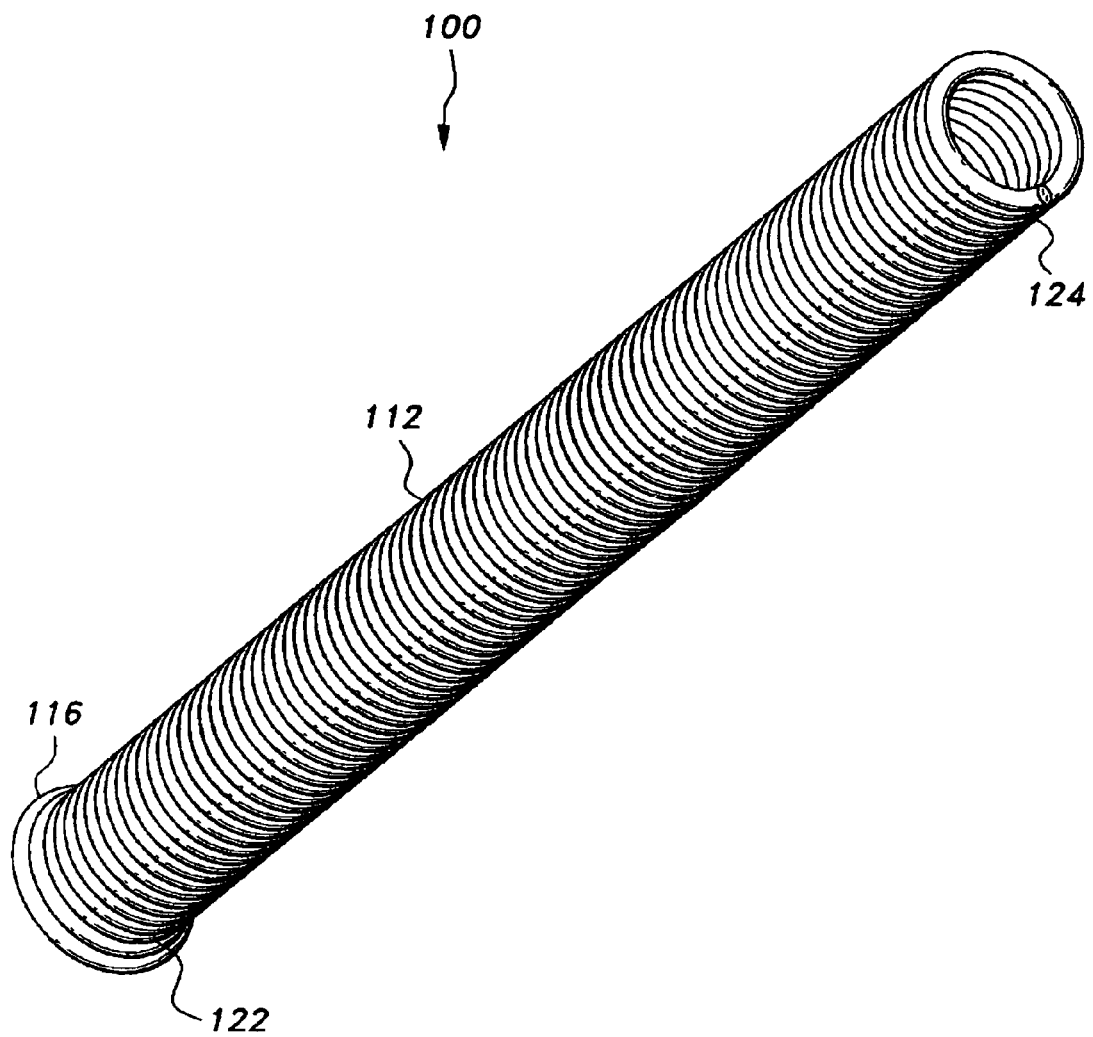
FIG. 4 is a perspective view of an alternative embodiment of the flexible insert for tubing according to the present invention.

In another embodiment, shown in FIG. 4, the insert 100 is an elongated, resilient, helical coil 112 having a single end turn 116 or loop at one end 122 of the coil that is of larger diameter than the remainder of the coil, and an opposite free end 124.

In use, the insert is placed inside the tubing T with either the annular flange 16 or the wider diameter end turn 116 abutting the open end of the tubing T prior to threading the nut N on the valve fitting S. The resilience and stiffness of the coil 12 or 112 prevents the tubing T from collapsing, but has sufficient flexibility to permit bending the tubing without permitting such a sharp radius that the tubing T might crack.

It is to be understood that the present invention is not limited to the embodiments described above, but encompasses any and all embodiments within the scope of the following claims.

We claim:

1. A flexible insert kit for flexible tubing, comprising:
    an O-ring dimensioned and configured for sliding over the flexible tubing;
    a compression nut adapted for fitting over the flexible tubing and mating with an externally threaded fitting, the nut compressing the O-ring to form a seal around the tubing; and
    an insert adapted for insertion into the flexible tubing, the insert consisting essentially of an elongated, unencumbered resilient, helical coil, thereby providing unrestricted flexibility, the insert having opposed first and second ends, said first end of the coil having an enlarged annular flange defining said first end and being adapted for abutting an open end of the flexible tubing, and a hollow, rigid, cylindrical sleeve having opposed first and second ends, the second end of the sleeve being enlarged and secured to the enlarged flange of the coil and being adapted for abutting an open end of the flexible tubing, and wherein the first end of the sleeve being secured to the coil, whereby the insert prevents collapse of the flexible tubing when the compression nut is tightened but permits bending of the flexible tubing while restricting the radius of bending to avoid cracks in the tubing adjacent the compression nut.

2. The insert kit as recited in claim 1, wherein said sleeve is metallic.

3. The insert kit as recited in claim 2, wherein the metal is stainless steel.

4. The insert kit as recited in claim 1, wherein said sleeve is secured to the coil by butt-welding.

* * * * *